(12) United States Patent
Ke

(10) Patent No.: US 7,746,579 B2
(45) Date of Patent: Jun. 29, 2010

(54) LENS ACTUATOR

(75) Inventor: Chau-Yuan Ke, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/341,373

(22) Filed: Dec. 22, 2008

(65) Prior Publication Data

US 2010/0033852 A1 Feb. 11, 2010

(30) Foreign Application Priority Data

Aug. 5, 2008 (CN) .................. 2008 1 0303388

(51) Int. Cl.
*G02B 7/02* (2006.01)
(52) U.S. Cl. ...................... 359/814; 359/694
(58) Field of Classification Search ............... 359/814
See application file for complete search history.

(56) References Cited

U.S. PATENT DOCUMENTS

2006/0245085 A1* 11/2006 Lee et al. ................. 359/813
2008/0186601 A1* 8/2008 Honma .................... 359/824

* cited by examiner

*Primary Examiner*—Jordan M. Schwartz
*Assistant Examiner*—James C Jones
(74) *Attorney, Agent, or Firm*—Clifford O. Chi

(57) ABSTRACT

A lens actuator includes a housing, a plurality of magnets, a base, and a coil-wrapped lens barrel. The housing includes a top panel, and a plurality of side panels cooperatively defining an accommodating space. The top panel defines a light passage. Each of the magnets is attached to an inner surface of each side panel. The base is fixed to an end of the housing and is opposite to the top panel. The lens barrel is resiliently mounted on the base, and is accommodated in the accommodating space.

15 Claims, 6 Drawing Sheets

LENS ACTUATOR

CROSS REFERENCE TO RELATED APPLICATION

This application is related to commonly-assigned copending application under Ser. No. 12/192,376, entitled "resilient plate and lens actuator with same". Disclosures of the above-identified application are incorporated herein by reference.

BACKGROUND

1. Technical Field

The present disclosure relates to lens actuators, and particularly relates to a voice coil motor type lens actuator.

2. Description of Related Art

Generally, lens modules employ an actuator such as a voice coil motor to move lenses relative to an image sensor, thereby varying a distance between the lenses and the image sensor to obtain a desired focal length. A typical voice coil motor includes a lens barrel accommodating the lens, a coil wrapped around the lens barrel, a plurality of magnets, a bracket bearing the magnets and accommodating the lens barrel, and a resilient plate connected between the bracket and the lens barrel holding the lens barrel on the bracket. The bracket includes a plurality of integrally formed frames.

However, such a voice coil motor is relatively large in volume, and use thereof requires a significant amount of space for movement of the lenses. In addition, the integrally formed bracket does not provide convenient assembly of the voice coil motor.

Therefore, what is needed is a lens actuator with more compact structure and fewer mechanical requirements.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of embodiments. Moreover, in the drawings, like reference numerals designate corresponding parts throughout the different views.

DETAILED DESCRIPTION OF THE EMBODIMENTS

Figure 1:
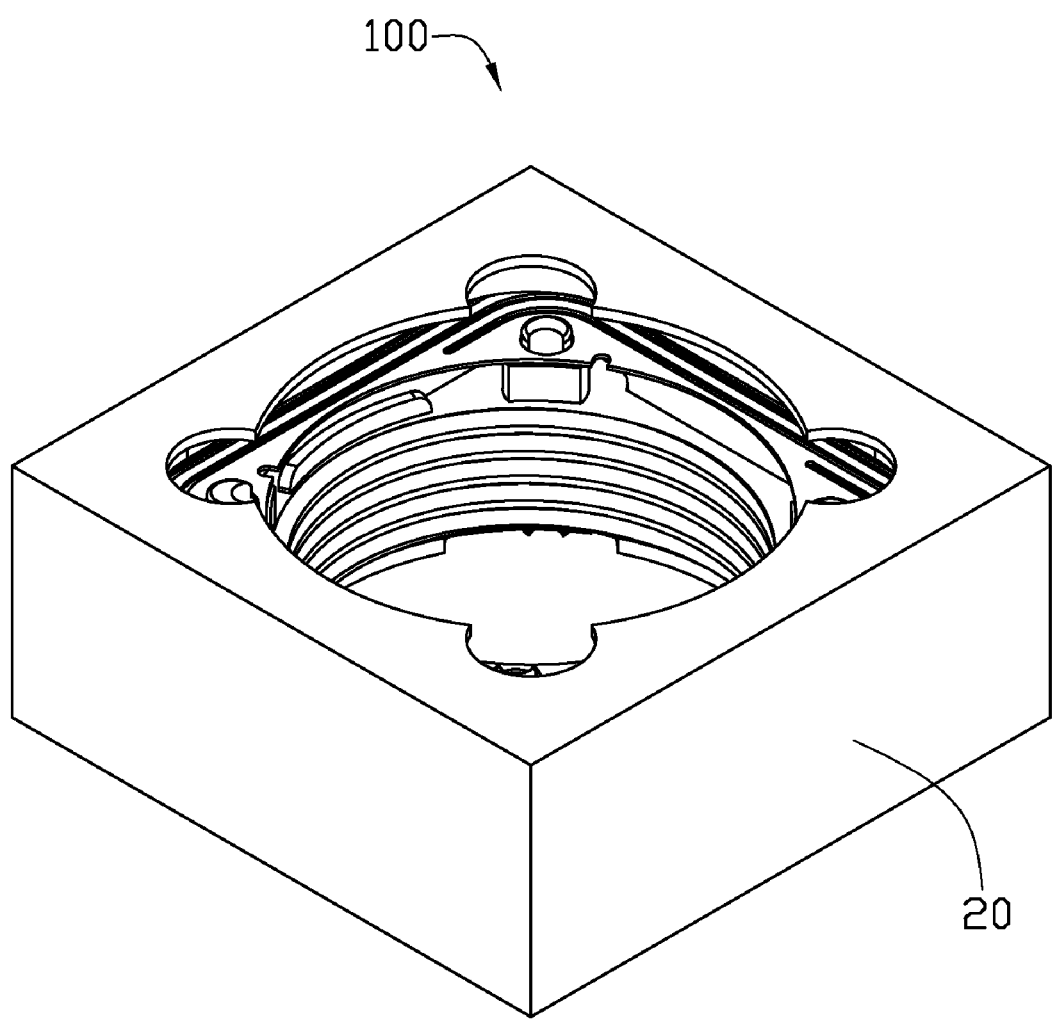
FIG. 1 is a schematic, isometric view of a lens actuator according to a first embodiment, including a housing, top and bottom resilient plates, a lens barrel, a coil, four magnets, and a base.
Figure 2:
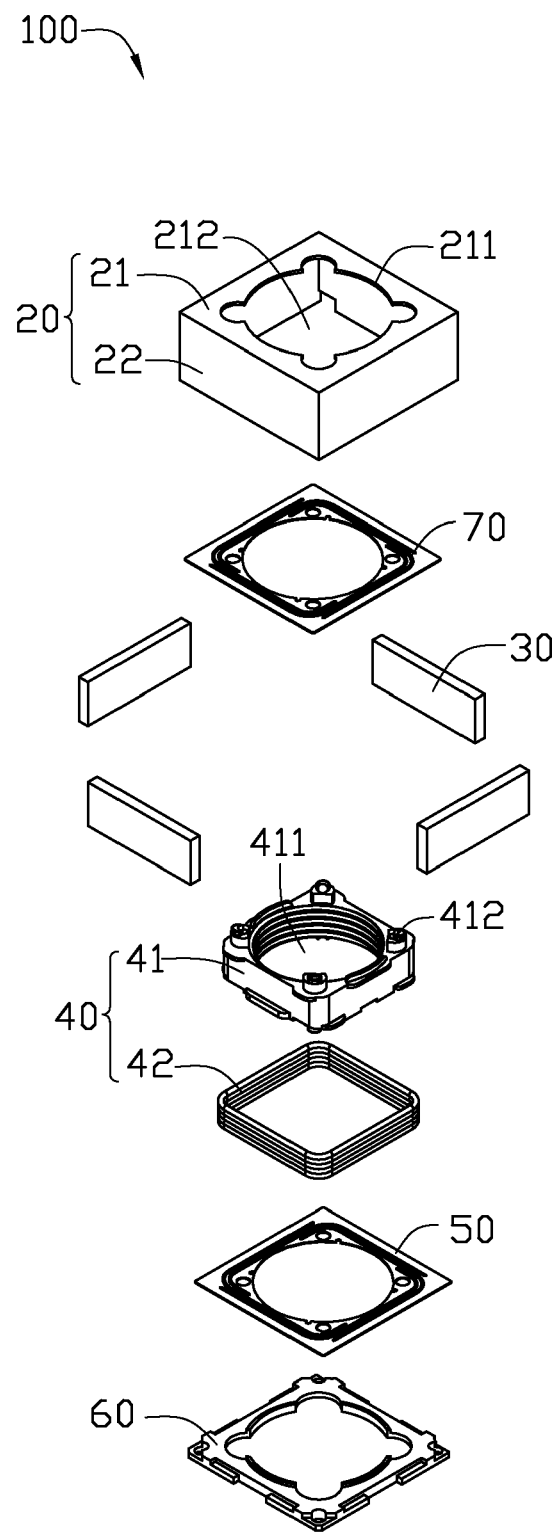
FIG. 2 is an exploded view of FIG. 1.

Referring to FIGS. 1, 2, a lens actuator 100 in accordance with a first embodiment includes a housing 20, a bottom resilient plate 50, a top resilient plate 70, four magnets 30, a moveable unit 40, and a base 60.

Housing 20 includes a top panel 21 and four side panels 22 extending from four peripheral sides thereof. The top panel 21 and the side panels 22 cooperatively define an accommodating space 212 for the resilient plates 50, 70, the movable unit 40, and the four magnets 30. The top panel 21 defines a first light passage 211 in the central portion thereof. The housing 20 is comprised of an electromagnetic shielding material, such as nickel alloy, conductive plastic, surface conductive material, conductive glass, or other.

The top and bottom resilient plates 70, 50 are parallel and spaced apart, and fixed on the four side panels 22 with each peripheral side thereof adhered to a corresponding side panel 22. The two resilient plates 70, 50 and the side panels 22 cooperatively define a cavity accommodating the movable unit 40 and the four magnets 30.

Figure 3:
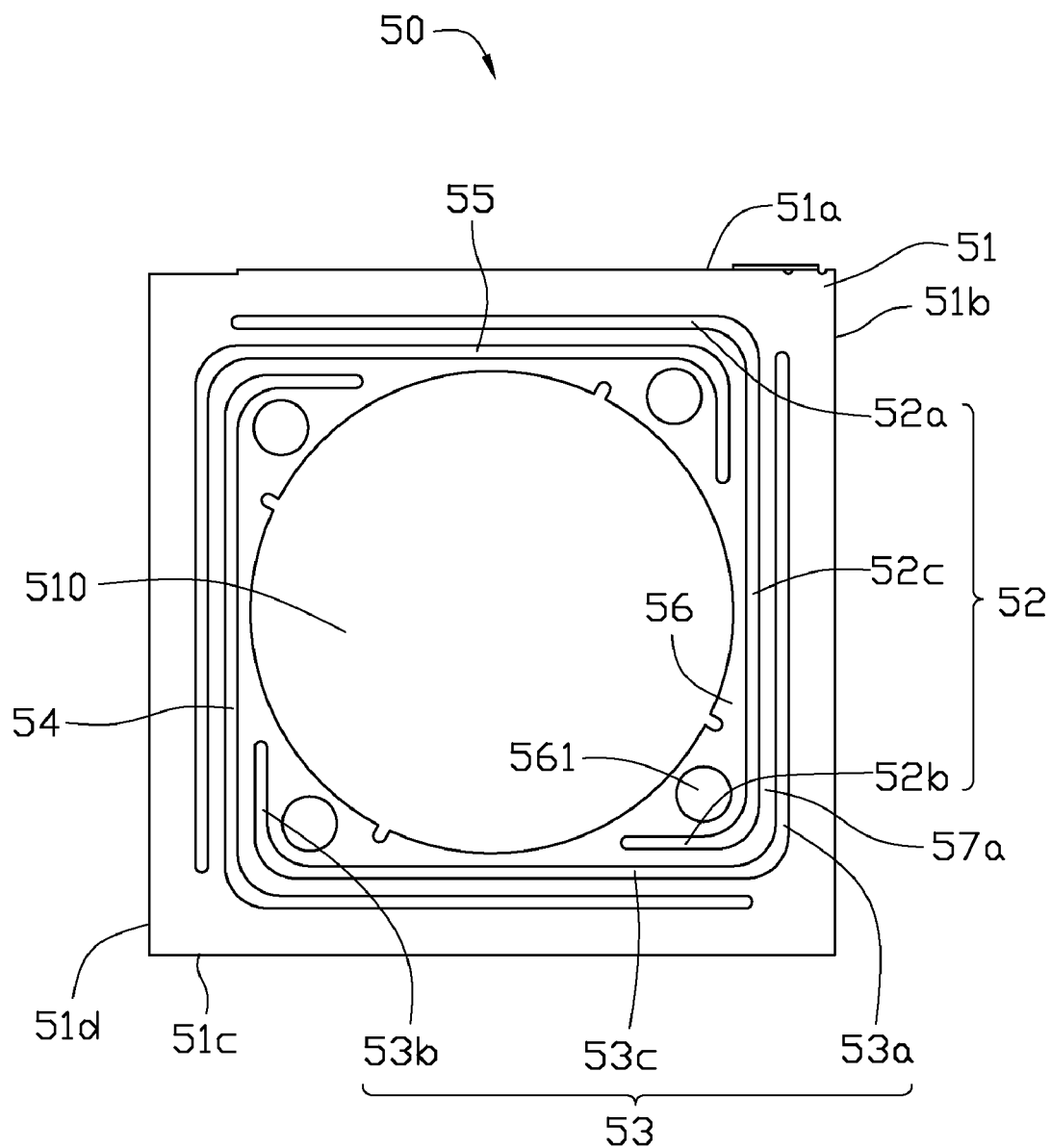
FIG. 3 is a schematic top view of the resilient plate shown in FIG. 2.

Referring to FIGS. 2 and 3, the bottom resilient plate 50 includes a plate body 51 having a first edge 51a, a second edge 51b, a third edge 51c, and a fourth edge 51d. The first edge 51a is parallel to the third edge 51c, and the second edge 51b is parallel to the fourth edge 51d. A second light passage 510 is defined at the center of the plate shaped body 51. The second light passage 510 is coaxial to the first light passage 211. The top resilient plate 70 has a structure similar to the bottom resilient plate 50.

A first slot 52, a second slot 53, a third slot 54 and a fourth slot 55 are defined in the plate shaped body 51 around the second light passage 510. Each neighboring slot is oriented about 90 degrees from the next.

The first slot 52 includes a first starting portion 52a, a first ending portion 52b, and a first connecting portion 52c. The first starting portion 52a is parallel to the first edge 51a. The first ending portion 52b is parallel to the third edge 51c. The first connecting portion 52c is parallel to the second edge 51b, and connected with the first starting portion 52a and the first ending portion 52b. The first ending portion 52b is shorter than or the same length as the first starting portion 52a.

The second slot 53 includes a second starting portion 53a, a second ending portion 53b, and a second connecting portion 53c. The second starting portion 53a is parallel and adjacent to the second edge 51b. The second ending portion 53b is parallel and adjacent to the fourth edge 51d. The second connecting portion 53c is parallel to and adjacent the third edge 51c, and connected with the second starting portion 53a and the second ending portion 53b. The second ending portion 53b is shorter than or the same length as the second starting portion 53a. The second starting portion 53a and the second connecting portion 53c are on the outer side of the first slot 52, that is, the second starting portion 53a and the second connecting portion 53c are closer to the second edge 51b and the third edge 51c than the first slot 52.

A fixing portion 56 is formed between the second light passage 510 and the slots 52, 53, 54, 55. The fixing portion 56 defines four pinholes 561. An L-shaped resilient portion 57a is formed between the first slot 52 and the second slot 53. In addition, resilient portions similar to the resilient portion 57a are also formed between the second slot 53 and the third slot 54, the third slot 54 and the fourth slot 55, the fourth slot 55 and the first slot 52. Since the L-shaped resilient portion 57a has an angular part, durability and flexibility of the bottom resilient plate 50 is enhanced.

The four magnets 30 are between the top and bottom resilient plate 70, 50. Each of the four magnets 30 is attached on a corresponding inner side surface (not shown) of each of the side panels 22, and contacts the top and bottom resilient plates 70, 50.

The base 60 and the housing 20 cooperatively receive the movable unit 40, the four magnets 30, and the top and bottom resilient plates 70, 50. Furthermore, the housing 20 and the base 60 protect the lens barrel and image sensor (not shown) from outside containments such as dust.

Figure 4:
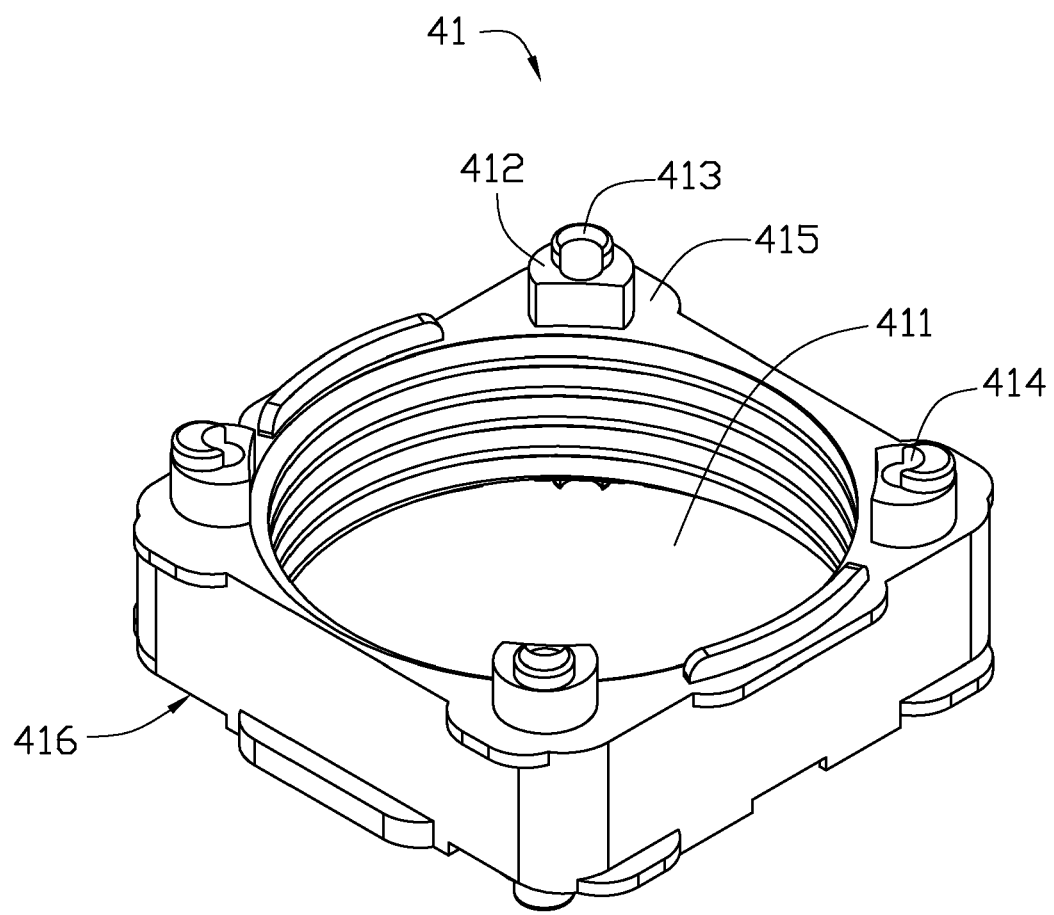
FIG. 4 is an isometric view of the lens barrel shown in FIG. 2.

Referring to FIGS. 2 and 4, the movable unit 40 includes a lens barrel 41 and coils 42. The movable unit 40 is accommodated between the two resilient plates 70, 50. The lens barrel 41 has a top end 415 and an opposite bottom end 416 and defines an accommodating cavity 411 in the center accommodating the lenses and filters (not shown). The accommodating cavity 411 extends through the top and bottom ends 415, 416. Four convex stages 412 respectively protrude from the top end 415 and the bottom end 416 of the lens barrel 41 at four corners thereof. A locating pin 413 protrudes from the top surface of the corresponding convex stage 412, and is accommodated in the pinhole 561 of the resilient plate 50. Two holes 414 are defined in the outer sidewall of each first locating pin 413. The holes 414 receive adhesive material therein. As such, the top and bottom ends 415, 416 of the lens barrel 41 are respectively glued (adhesively mounted) to the top and bottom resilient plates 70, 50, thereby fixing the lenses or the filters in the lens barrel 41. The coils 42 are wrapped around the side wall of the lens barrel 41.

When an electric current is applied, the coils 42 produce a magnetic force to move the lens barrel 42 between the top and bottom resilient plates 70, 50. When the electric current is interrupted, resilient force from the top or bottom resilient plates 70, 50 resets the lens barrel 41 to its original position relative to the magnets 30.

Neither the shape and structure of the plate body 51 nor the number of magnets 30 used are limited to those disclosed in this embodiment, and the top resilient plate 70 can be omitted, with the lens barrel 41 resiliently mounted on the base 60 by other connecting member such as a spring, and the magnets 30 may not contact the top and bottom resilient plates 70, 50, all while remaining well within the scope of the disclosure.

In this embodiment the lens actuator 100 does not include a bracket and the magnets 30 are directly attached on the inner side of the side panel 22. Therefore, the lens actuator 100 has compact structure and is conveniently assembled.

Figure 5:
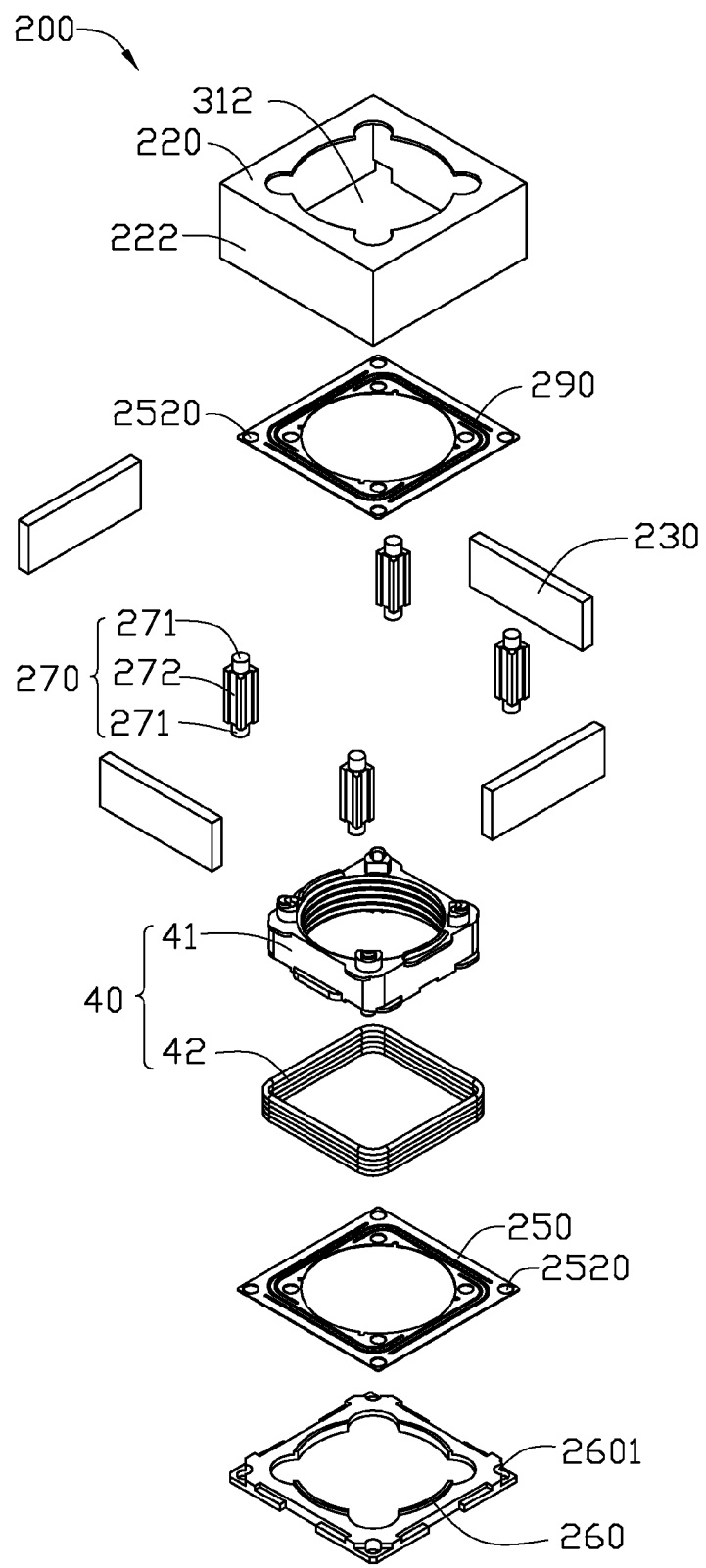
FIG. 5 is an exploded, isometric view of a lens actuator according to a second embodiment.

FIG. 5 shows a lens actuator 200 of a second embodiment, differing from the previous embodiment only in the further inclusion of four securing members 270. The two resilient plates 290, 250 define four openings 2520 in four corners thereof. The base 260 further defines four recesses 2601 in four corners thereof. Each securing member 270 includes two end portions 271 and an intermediate portion 272. One end portion 271 of each securing member 270 is glued and received in a corresponding recess 2601, and another end portion of each securing member 270 passes through the opening 2520. The securing members 270 are fixed on the housing 220 with a surface of the intermediated portion 272 attached on the inner side surface of a corresponding side panel 222. In this way, every two securing members 270 cooperatively secure a corresponding magnet 230 therebetween and the four securing members 270 cooperatively fix the resilient plates 250 in the accommodating space 312.

Figure 6:
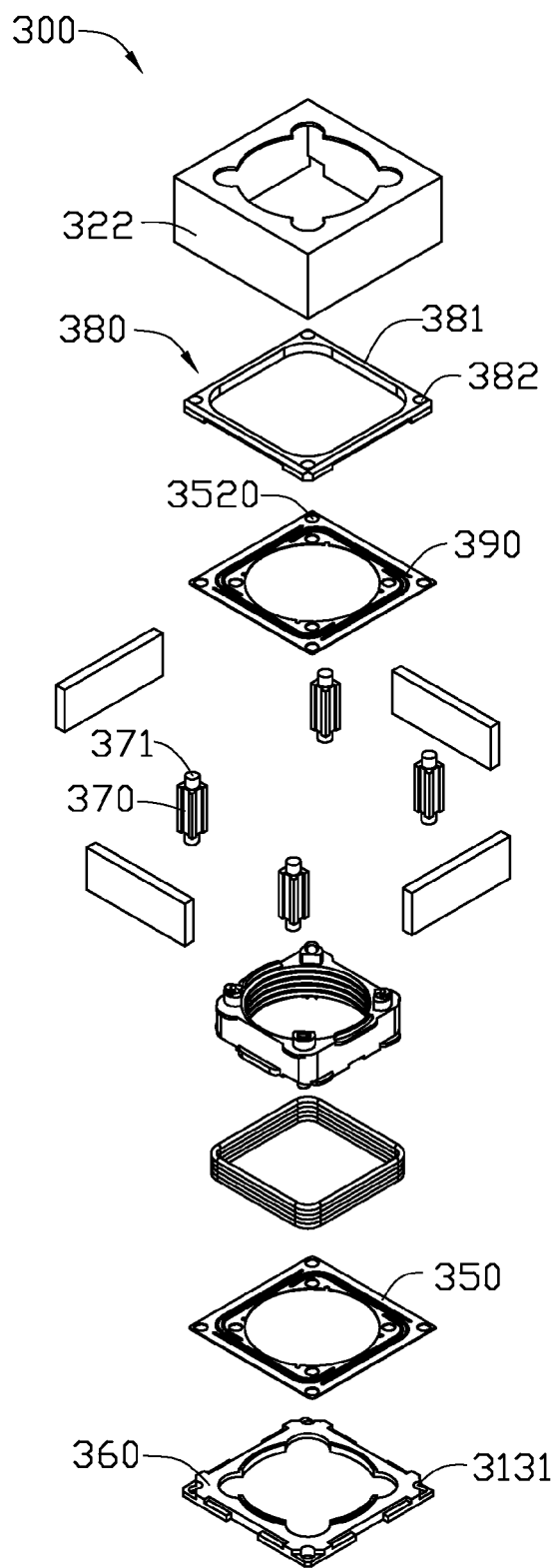
FIG. 6 is an exploded, isometric view of a lens actuator according to a third embodiment.

FIG. 6 shows a lens actuator 300 of a third embodiment, differing from the previous embodiment only in the further inclusion of a resilient plate cover 380 covering the top resilient plate 390. The resilient plate cover 380 includes four integrally formed frames 381 and defines four through holes 382 in four corners thereof. Each frame 381 is glued on a corresponding side panel 322, thus the top resilient plate cover 380 is attached to the top resilient plates 390. An end portion 371 of each securing member 370 is received in the through hole 382 via the opening 3520 of the top resilient plate 390. The bottom resilient plate 350 is directly fixed to the base 360. In this manner, the top resilient plate 390 is protected from damage and the lens actuator 300 can be more conveniently assembled.

While certain embodiments have been described and exemplified above, various other embodiments will be apparent to those skilled in the art from the foregoing disclosure. The present disclosure is not limited to the particular embodiments described and exemplified but is capable of considerable variation and modification without departure from the scope of the appended claims.

What is claimed is:

1. A lens actuator, comprising:
   a housing comprising a top panel and a plurality of side panels, the top panel and the side panels cooperatively defining an accommodating space, the top panel defining a light passage;
   a plurality of magnets, each attached on an inner surface of each side panel;
   a base fixed to an end of the housing and opposite to the top panel;
   a bottom resilient plate accommodated in the accommodating space, and comprising a plurality of peripheral sides, each peripheral side being adhered to a corresponding side panel; and
   a coil-wrapped lens barrel accommodated in the accommodating space, and comprising a bottom end resiliently fixed to the bottom resilient plate.

2. The lens actuator as claimed in claim 1, further comprising a top resilient plate to which a top end of the lens barrel is fixed, with the magnets between the top and bottom resilient plates.

3. The lens actuator as claimed in claim 2, farther comprising a plurality of securing members disposed between the top and bottom resilient plates, each two adjacent securing members securing a corresponding magnet therebetween.

4. The lens actuator as claimed in claim 3, wherein each of the securing members contacts a corresponding side panel.

5. The lens actuator as claimed in claim 1, wherein the bottom resilient plate is directly fixed to the side panels.

6. The lens actuator as claimed in claim 5, wherein the bottom resilient plate contacts the magnets.

7. The lens actuator as claimed in claim 1, wherein the bottom resilient plate is directly fixed to the base.

8. The lens actuator as claimed in claim 2, further comprising a resilient plate cover fixed on inner side walls of the side panels and attached to the top resilient plate.

9. A lens actuator, comprising:
   a housing comprising a top panel and a plurality of side panels, the top panel and the side panels cooperatively defining an accommodating space, the top panel defining a light passage;
   a plurality of magnets, each attached on an inner surface of each side panel;
   a base fixed to an end of the housing and opposite to the top panel;
   a coil-wrapped lens barrel resiliently mounted on the base, the lens barrel being accommodated in the accommodating space, and comprising a bottom end; and
   a bottom resilient plate directly fixed to the side panels and the bottom end of the lens barrel.

10. The lens actuator as claimed in claim 9, further comprising a plurality of securing members, wherein each of the securing members contacts a corresponding side panel.

11. The lens actuator as claimed in claim 9, wherein the bottom resilient plate contacts the magnets.

12. The lens actuator as claimed in claim 9, further comprising a top resilient plate fixed to a top end of the lens barrel, wherein the magnets are disposed between the top and bottom resilient plates.

13. The lens actuator as claimed in claim 12, further comprising a plurality of securing members disposed between the top and bottom resilient plates, wherein each two adjacent securing members secures a corresponding magnet therebetween.

14. The lens actuator as claimed in claim 9, wherein the bottom resilient plate is directly fixed to the base.

15. The lens actuator as claimed in claim 12, further comprising a resilient plate cover fixed on inner side walls of the side panels and attached to the top resilient plate.

* * * * *